June 8, 1965
G. CUOMO
3,187,432
CHEESE CUTTING APPARATUS
Filed Oct. 30, 1963
2 Sheets-Sheet 1
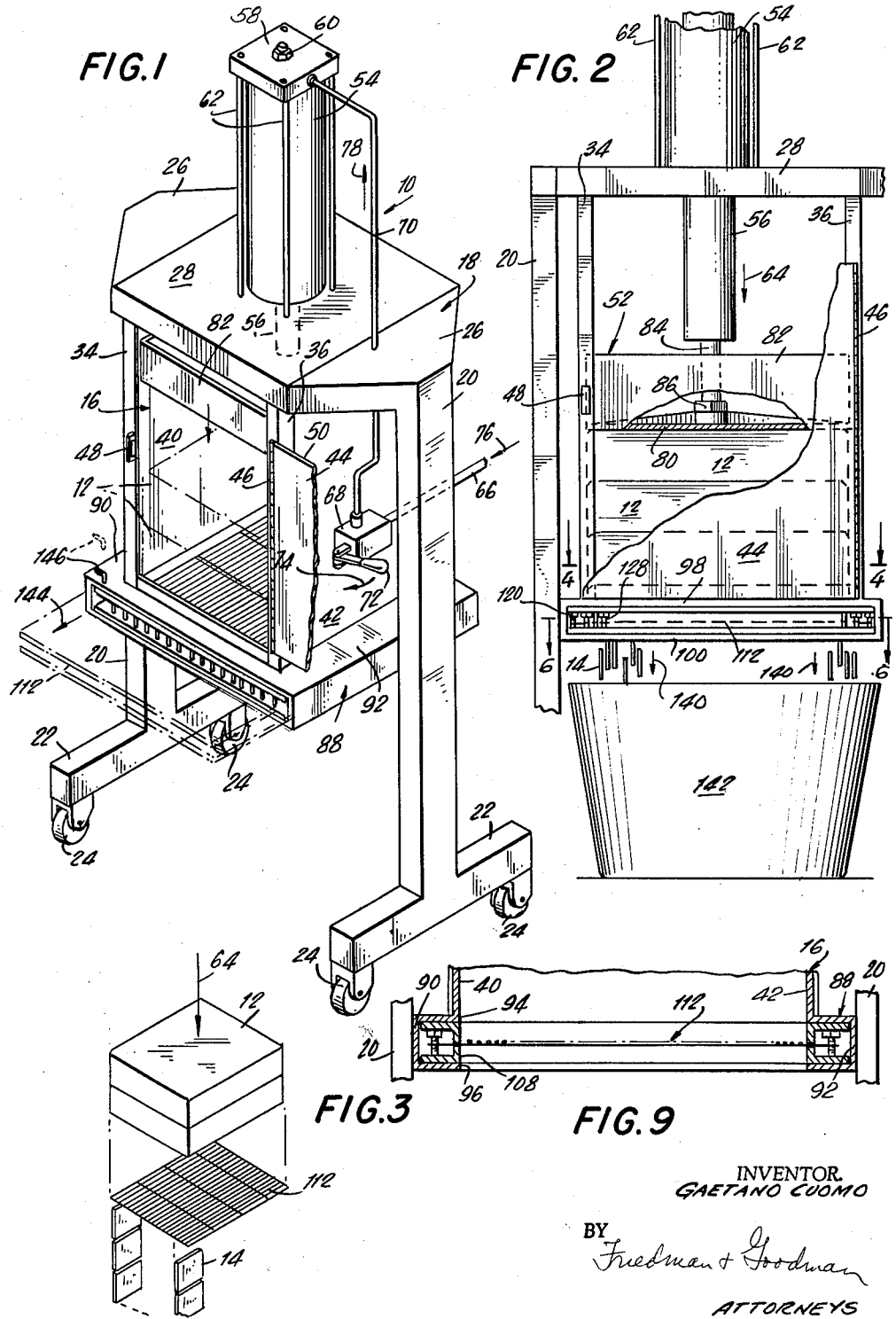
INVENTOR.
GAETANO CUOMO
BY Friedman & Goodman
ATTORNEYS

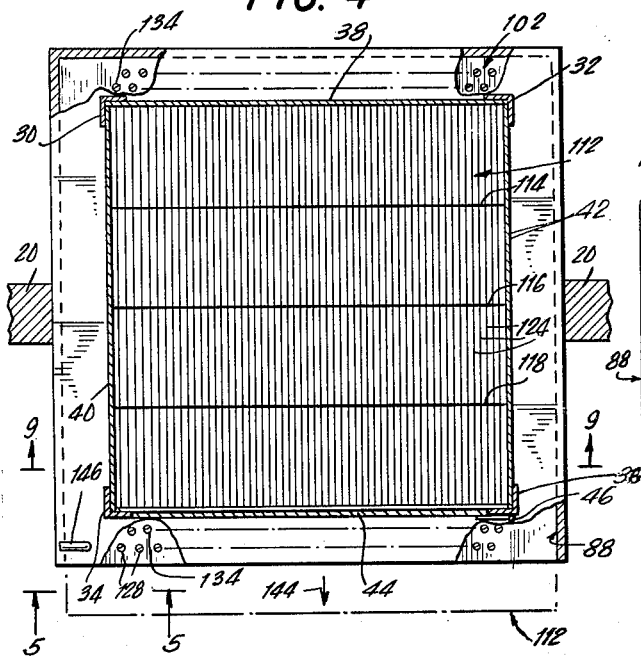
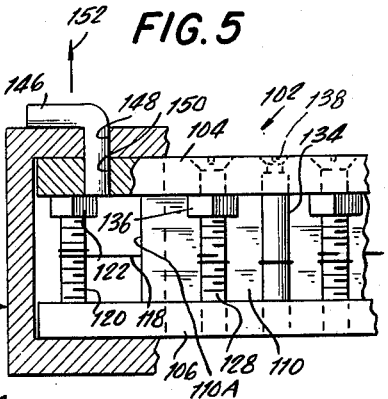
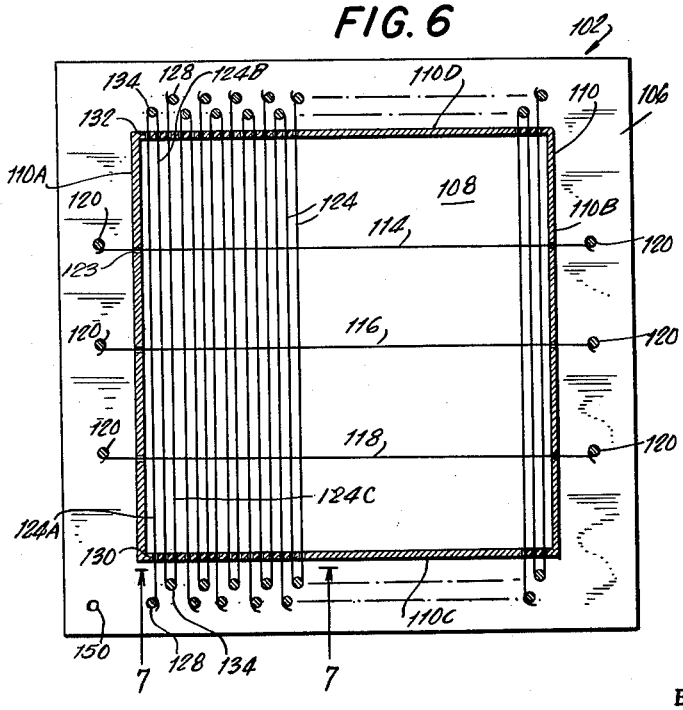
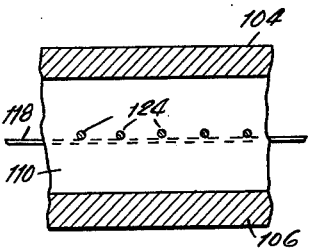
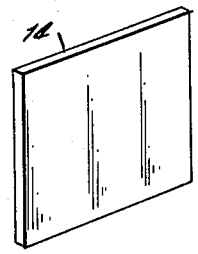

United States Patent Office 3,187,432
Patented June 8, 1965

3,187,432
CHEESE CUTTING APPARATUS
Gaetano Cuomo, Rochester, N.Y., assignor to Pollio Dairy Products Corporation, a corporation of New York
Filed Oct. 30, 1963, Ser. No. 320,140
1 Claim. (Cl. 31—21)

The present invention relates in general to a cheese cutting apparatus and in particular to a device for cutting cheese into blocks, squares or sects.

It is an object of the present invention to provide a highly novel and efficient apparatus for cutting a large block of cheese into relatively small pieces which may be in the form of squares or blocks suitable for packaging, cooking or any other intended use thereof.

It is another object of the present invention to provide a cheese cuting apparatus which is of relatively large capacity but which nevertheless has a minimum number of relatively inexpensive parts so that the device can be manufactured and sold at a relatively low cost.

It is another object of the present invention to provide a device of the described type which can always be maintained in a highly sanitary condition having readily accessible parts which can be cleaned at frequent intervals as may be required in a relatively simple manner.

It is a still further object of the present invention to provide a device of the desired type which can be readily adjusted to change the size of the squares or blocks which are produced thereby.

Other and further objects of the present invention will be readily apparent to one skilled in the art from a consideration of the following specification taken in connection with the appended drawings.

In the drawings which illustrate the best mode presently contemplated for carrying out the invention, FIGURE 1 is a perspective view of a cheese cutting apparatus pursuant to the present invention, the device being shown in the inoperative position thereof and a portion thereof being broken away for purposes of illustration;

FIGURE 2 is a front elevational view of the device of the present invention on an enlarged scale with portions thereof being broken away and illustrated in section for purposes of illustration, the device being illustrated in the operative or cheese cutting condition thereof;

FIGURE 3 is a more or less diagrammatic view which illustrates the operation of the device of the present invention;

FIGURE 4 is a sectional view on an enlarged scale taken on the line 4—4 of FIGURE 2 with portions being broken away for purposes of illustration;

FIGURE 5 is a fragmentary sectional view on an enlarged scale taken on the line 5—5 of FIGURE 4;

FIGURE 6 is a sectional view on an enlarged scale taken on the line 6—6 of FIGURE 2;

FIGURE 7 is a fragmentary sectional view taken on the line 7—7 of FIGURE 6;

FIGURE 8 is a perspective view of a block or square of cheese which is produced by the apparatus of the present invention; and FIGURE 9 is a sectional view taken on the line 9—9 of FIGURE 4.

Pursuant to the present invention, there is provided a cheese cutting apparatus which is generally indicated by the reference numeral 10. The cheese cutting apparatus 10 operates on relatively large chunks or blocks of cheese 12 to cut or segment the large blocks into relatively small squares, slices or segments 14 which can thereafter be packaged or processed or used for cooking or used for eating or for any other purpose to which cheese may be put. The blocks 12 may be mozzarella or other suitable cheeses which may be readily cut such as for example and not by way of limitation Swiss cheese, Edam cheese, American cheese or other similar cheeses which are of the sliceable rather than the spreadable type. The sizes of the slices or squares 14 may be changed, as may be desired, by a relatively simple and expeditious change in one of the parts of the cheese cutting apparatus 10 as is hereinafter described in detail.

As here shown, the cheese cutting apparatus 10 comprises an enclosed cabinet 16 which is mounted by a movable support or base 18. The base 18 comprises a pair of cooperating arms 20—20 between which the cabinet 16 is mounted, the arms 20 being provided with legs 22 each of which mounts a pair of casters or rollers 24. The casters 24 allow for free mobility of the cheese cutting apparatus 10 as may be required.

At the upper end thereof each arm 20 is provided with a lateral substantially triangular flange 26 it being noted that the flanges 26 of the cooperating arms 20 are in confronting relation.

The previously mentioned cabinet 16 is mounted between the opposing arms 20 by the cooperating flanges 26. More specifically, the cabinet 16 is provided with a top wall 28 which is mounted between the opposing flanges 26. The top wall 28 mounts four elongated right angular elements 30, 32, 34 and 36. As best seen in FIGURE 2, said angular elements depend from the wall 28. A rear wall 38 for the cabinet 16 is mounted by the right angular members 30 and 32. One side wall 40 for the cabinet 16 is mounted by the right angular members 30 and 34 and the opposing side wall 42 is mounted by the right angular members 32 and 36. It will be noted that the right angular members 34 and 36 are the front right angular members of the cabinet 16 and the right angular members 30 and 32 are the rear right angular members for said cabinet. The front of the cabinet 16 is closed by the door 44 is provided on the front right angular member on the front right angular member 36. A lock 48 for the door 44 is provided on the front right angular member 34. The upper marginal edge 50 of the door is spaced below the top wall 28 of the cabinet, as best seen in FIGURE 2. From the foregoing, it will be apparent that the cabinet 16 is closed at the top and at the four sides thereof it being noted that the cabinet 16 is substantially rectangular in cross section.

The cheese cutting operation is effected by a press 52 which is mounted for vertical reciprocation within the cabinet 16. The press 52 is operated by a pneumatic cylinder 54 which is mounted on the top wall 28 of the cabinet 16. The cylinder 54 is provided with a piston or plunger 56 on which the press 52 is mounted. In order to firmly mount the pneumatic cylinder 54 in position on the upper surface of the top wall 28, the cylinder is provided with an end plate or cap 58 which is secured thereto as by a bolt 60. Four mounting rods 62 are secured at one end thereof to the end plate 58 and at the other end thereof to the upper wall 28 so as to securely mount the cylinder 54 in position on the upper surface of the wall 28. It will be understood that the upper wall 28 is suitably apertured so that the piston 56 may extend from the cylinder 54 through the upper wall 28. In order to supply compressed air to the pneumatic cylinder 54 so as to cause the press 52 to move downwardly in the direction of the arrow 64 from its raised or retracted position as illustrated in FIGURE 1 to its lowered or operative position as illustrated in FIGURE 2 provision is made for a first air conduit 66 which extends from a suitable source of compressed air to a manually operable valve 68. A second air conduit 70 extends from the valve 68 to the end plate 58 for supplying air through the latter to the upper end of the pneumatic cylinder 54. The valve 68 is provided with a manually operated control member 72 which is pivotable in the direction of the arrow 74 to open the valve 68 so as to supply air to the pneumatic cylinder 54, the air passing through the first air conduit 66 in the direction indicated by the arrow 76 and then passing through the open valve 68 and up the second conduit 70 as indicated by the arrow 78 so as to energize the piston to move the latter downwardly as indicated by the arrow 64.

As here shown, the press 52 comprises a substantially rectangular horizontal press plate 80 which is provided with a rectangular frame 82 which extends upwardly therefrom. The press plate 80 is mounted on a mounting extension or rod 84 which is provided at the lower end of the piston 56, the rod 84 being threaded into the press plate 80 and secured thereto as by the bolt 86. It will be apparent from a comparison of FIGURES 1 and 2 that when the piston 56 is in the retracted position thereof the press 52 is positioned at the lower surface of the upper wall 28 of cabinet 16 and closes the space between the upper edge 50 of the cabinet door 44 and the lower surface of the upper wall 28.

At the bottom thereof, the cabinet 16 is provided with a slideway 88. The slideway 88 is constituted by the opposing tracks 90 and 92 which extend along the opposing side walls 40 and 42 of the cabinet 16. It will be noted from FIGURES 1 and 2 that the slideway 88 is open at the front of the cabinet 16 and is preferably closed at the rear of the cabinet 16. Moreover, it will be noted from FIGURE 9 that the cabinet 16 is open at the bottom thereof as indicated by the opening 94 which is defined by the opposing side walls 40 and 42. It will also be noted from FIGURE 9 that the guideway 88 is open at the bottom thereof, said bottom opening being indicated by the reference numeral 96 and it will be understood that the openings 94 and 96 are in registry. It will also be noted from FIGURES 1 and 2 that the tracks or guides 90 and 92 are interconnected both at the top and bottom thereof as indicated at 98 and 100 respectively in FIGURES 1 and 2, it being understood however that the interconnecting portions 98 and 100 do not extend into the openings 94 and 96.

The slideway 88 is adapted to receive a cutting grid assembly 102. As best shown in FIGURES 5, 6 and 7, the cutting grid assembly 102 comprises a wall member 110 having rectangular flanges 104 and 106. Each flange is provided with a central rectangular opening 108. The associated flanges 104 and 106 mount a wire cutting grid 112. As here shown, the wire cutting grid 112 is constituted by three transversely extending wires 114, 116 and 118 which extend between the opposing wall portions 110A and 110B of the wall 110. The wires 114, 116 and 118 are securely wrapped or tied at each end thereof to a threaded bolt 120 which extends between the flanges 104 and 106 and which is secured in position thereto as by a nut 122. As best seen in FIGURE 6, there are two rows of bolts 120 each row having three aligned bolts therein and each row extending along one side of the grid assembly 102. The opposing wall portions 110A and 110B of the wall 110 are provided with apertures 123 through which the transverse wires 114, 116 and 118 extend as best illustrated in FIGURE 6. The grid 112 in addition to the transverse wires 114, 116 and 118 is provided also with the vertically extending wires 124 which extend transversely of the transverse wires 114, 116 and 118 and are seated on said transverse wires as best illustrated in FIGURE 7. Each wire 124 has three runs extending between the wall portions 110C and 110D of the wall 110. More specifically, the first run 124a extends from a threaded bolt 128 around which one end of the wire 124 is wrapped and secured through an aperture 130 in the wall portion 110C and transversely of the transverse wires 118, 116, and 114 and through an opposing aperture 132 in the opposing wall portion 110D and then around a stud 134. It will be noted that the bolt 128 and the stud 134 are secured in position between the superposed frames 104 and 106, the bolt being secured in position as by a nut 136 the stud having a head 138 countersunk in the upper flange 104. The second run 124B of the wire 124 extends from the stud 134 through an aperture 132 in wall portion 110D transversely of the wires 114, 116 and 118 and being seated thereupon to an associated stud 134 adjacent the opposing wall portion 110C. It will be noted that said wire run 124B extends through an aperture 130 in the wall portion 110C. The third wire run 124C extends from the bolt 134 adjacent to the wall portion 110C and through an aperture 130 provided in the latter and transversely of the transverse wires 118, 116, and 114 being seated thereon and through an aperture 132 provided in the wall portion 110D and being wrapped around a threaded bolt 128 secured adjacent to the wall portion 110D between the overlying frame members. Consequently, it will be apparent that each wire 124 has three runs, the wire starting at a threaded bolt 128 about which it is wound and secured then extending for its first run to a first stud 134 about which it extends the second run then extending from the first stud 134 to a second stud 134 about which it extends and then extending from the second stud to a second threaded bolt about which it is wound and secured at the upper end thereof. As best seen in FIGURE 6 adjacent each of the wall portions 110C and 110D there is a first outer row of threaded studs 128 and a second inner row of bolts 134 extending along each of said walls, each row being offset from the adjacent row so as to permit for the passage of wires between the rows of outer bolts and inner studs.

In order to operate the cheese cutting apparatus 10 of the present invention, a cutting grid assembly 112 is disposed within the guideway 88. With the door 44 of the cabinet 16 open and the press 52 in the retracted position thereof as shown in FIGURE 1, one or more blocks 12 of cheese are deposited on the cutting grid assembly being seated thereon between the side walls of the cabinet 16 and overlying the cutting grid assembly at the open bottom of the cabinet 16. The door 44 is then closed and locked by means of the lock 48 and the manual control 72 is actuated to permit for the flow of compressed air into the pneumatic cylinder 54. This causes the piston 56 to descend as indicated by the arrow 64 so that the press 52 will force the cheese 12 through the grid assembly 112 as diagrammatically illustrated in FIGURE 3, the cheese being cut by the grid assembly as it is forced therethrough into the squares, segments or slices 14. The cheese slices 14 drop from the cutting grid assembly 112 as indicated by the arrow 140 in FIGURE 2 and fall into an underlying receptacle 142.

It will be apparent that the size of the slices or blocks 14 can be changed by using a grid assembly 112 having larger or smaller spaces therein as may be desired. It will be understood that the size of the spaces may be changed by changing the distance between the transverse wires 114, 116 and 118 and/or by changing the distance between the runs of the longitudinal wires 124.

At the termination of each cutting operation, the valve 68 is operated to return the press to the upper position thereof as shown in FIGURE 1 and a new supply of cheese may then be placed within the cabinet 16. It will be noted that when the cabinet 16 is closed by the door 44 the cheese is prevented from spreading under the pressure of the press 52 being confined by the closed side walls front and rear walls of the cabinet 16. Furthermore, it will be understood that in lieu of tying the ends of the longitudinal wires 124 to the threaded bolts 128, said bolts may if desired be provided with transverse apertures through which the ends of the wires can extend so that the wires may then be knotted or otherwise tied securely to the threaded bolts.

The cutting grid assembly is readily removable from guideway 88 by withdrawing it in the direction of arrow 144 for cleaning or replacement. The assembly is retained in position by a pin 146 inserted through hole 148 in slideway 88 into hole 150 in upper frame member 104. By withdrawing the pin in the direction of arrow 152, the assembly 102 is released. The various parts of the cabinet 16 are formed of a material which can easily be cleaned, for example, stainless steel, so that the apparatus can always be maintained in a sanitary condition.

From the foregoing, it will be apparent that there has been illustrated and described a highly novel, efficient and easily operable cheese cutting press for cutting large blocks of cheese into small slices, squares or segments. It will be understood that various changes or modifications may be made therein without however departing from the basic inventive concept of the present invention as set forth in the appended claim.

I claim:

A cheese cutter comprising a totally enclosed cabinet having a bottom opening and guideway means at said bottom opening, a cutting grid assembly mounted in said bottom opening, and a press mounted in said cabinet for vertical reciprocation relative to said grid assembly whereby a block of cheese mounted on said grid assembly will be forced therethrough by movement of said press toward said grid assembly, said cabinet having a top wall, a pneumatic cylinder mounted on said top wall, and a piston extending from said cylinder through said top wall, said press being mounted by said piston, said cutting grid assembly comprising a rectangular wall having a rectangular flange at each end thereof, first wire means extending transversely of said wall between first opposing portions of said wall means, and second wire means extending transversely of said first wire means across second opposing portions of said wall, and means for anchoring said first and second wire means to said flanges, said first wire means being a plurality of individual laterally spaced wires each having a single run, said second spaced wire means being a plurality of individual laterally spaced wires each having a plurality of runs which overlie said single runs, said anchoring means for said first wire means being a threaded bolt at each end of each individual wire, said anchoring means for said second wire means being a threaded bolt at each end of each wire thereof, and a stud about which each of said latter wires passes for defining a pair of runs therein.

References Cited by the Examiner
UNITED STATES PATENTS

| | | | |
|---|---|---|---|
| 628,405 | 7/99 | Gillette | 31—22 |
| 1,122,960 | 12/14 | Longfellow et al. | 31—26 |
| 2,563,237 | 8/51 | Grocoff | 31—22 |
| 2,884,694 | 5/59 | Hannon et al. | 31—44 |

SAMUEL KOREN, *Primary Examiner.*

HUGH R. CHAMBLEE, *Examiner.*